(12) United States Patent
Spanrad (10) Patent No.: US 11,939,885 B2
(45) Date of Patent: Mar. 26, 2024

(54) ENGINE COMPONENT WITH MODIFICATION AREA FOR INFLUENCING CRACK PROPAGATION AND METHOD OF MANUFACTURING

(71) Applicant: Rolls-Royce Deutschland Ltd & Co KG, Blankenfelde-Mahlow (DE)

(72) Inventor: Sven Klaus Spanrad, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 178 days.

(21) Appl. No.: 17/625,036

(22) PCT Filed: Jun. 29, 2020

(86) PCT No.: PCT/EP2020/068216
§ 371 (c)(1),
(2) Date: Jan. 5, 2022

(87) PCT Pub. No.: WO2021/004821
PCT Pub. Date: Jan. 14, 2021

(65) Prior Publication Data
US 2022/0290634 A1 Sep. 15, 2022

(30) Foreign Application Priority Data
Jul. 9, 2019 (DE) .......................... 102019118549.1

(51) Int. Cl.
*F01D 5/14* (2006.01)
*F01D 5/28* (2006.01)
*F01D 5/34* (2006.01)

(52) U.S. Cl.
CPC ............. *F01D 5/286* (2013.01); *F01D 5/141* (2013.01); *F01D 5/34* (2013.01); *F05D 2260/941* (2013.01)

(58) Field of Classification Search
CPC ..... F01D 5/286; F01D 5/141; F05D 2260/941
See application file for complete search history.

(56) References Cited

U.S. PATENT DOCUMENTS 5,071,492 A 12/1991 Parker et al.
2008/0003109 A1 1/2008 Luna et al.
(Continued)

FOREIGN PATENT DOCUMENTS

DE 102017218886 A1 4/2019
EP 1662092 A2 5/2006
(Continued)

OTHER PUBLICATIONS

German Search Report dated Mar. 26, 2020 from counterpart German Patent Application No. 10 2019 118 549.1.
(Continued)

*Primary Examiner* — Michael L Sehn
(74) *Attorney, Agent, or Firm* — SHUTTLEWORTH & INGERSOLL, PLC; Timothy J. Klima (57) ABSTRACT

The proposed solution relates, in particular, to an engine component having
at least one first loading zone, which is designed for dynamic loads arising at the engine component when the engine component is correctly built into an engine and when the engine is operating, and
a second loading zone, which is provided spaced at a distance from the first loading zone on the engine component and likewise is designed for dynamic loads arising at the engine component when the engine component is correctly built into an engine and when the engine is operating.
The proposal is, in particular, that at least one spatially delimited modification zone with introduced internal tensile stress is formed on the engine component, via which zone a
(Continued)

crack propagating in the engine component is guided to the and/or within the second loading zone.

20 Claims, 6 Drawing Sheets

(56) References Cited

U.S. PATENT DOCUMENTS

2015/0165515 A1    6/2015   Hawkes et al.
2018/0134370 A1*   5/2018   Lim ......................... B21B 1/08

FOREIGN PATENT DOCUMENTS

EP          3321381 A1    5/2018
EP          3480430 A1    5/2019

OTHER PUBLICATIONS

Internatiioonal Search Report and Written Opinion dated Oct. 12, 2020 from counterpart International Patent Application No. PCT/EP2020/068216.

* cited by examiner

ENGINE COMPONENT WITH MODIFICATION AREA FOR INFLUENCING CRACK PROPAGATION AND METHOD OF MANUFACTURING

This application is the National Phase of International Application PCT/EP2020/068216 filed Jun. 29, 2020 which designated the U.S.

This application claims priority to Italian Patent Application No. 102019118549.1 filed Jul. 9, 2019, which application is incorporated by reference herein.

The proposed solution relates to an engine component for an engine, in particular a gas turbine engine for an aircraft, and to a method for producing an engine component.

Components subject to different loads are used in an engine. Particularly in the region of a fan, a compressor and a turbine of the engine, engine components are provided which are exposed to comparatively complex dynamic loads when the engine is operating. These include, in particular, engine components in which quasi-static loads and high-frequency and highly cyclical loads are superposed when the engine is operating. These are loads which relate to low cycle fatigue (LCF) and high cycle fatigue (HCF). Corresponding engine components are rotors for a compressor or a turbine, for example.

In the case of such dynamically loaded engine components, damage which occurs to the engine component can be predicted only with difficulty. However, it is desirable precisely in this context that, for example, a crack which forms does not propagate in an uncontrolled way in the engine component and, in particular, does not propagate into a loading zone classified as critical. Thus, for example, unhindered and uncontrolled crack propagation in a loading zone classified as critical can lead to parts of the engine component breaking off in an uncontrolled manner and causing critical faults within the engine, or to the respective engine component failing completely in such a way that the engine itself fails.

For a rotor as an engine component, EP 3 480 430 A1 envisages providing different material or layer thicknesses on a rotor blade of the rotor in order, at a transition between portions of different thickness, to define a defined crack edge along which a crack that is forming is supposed to propagate over the rotor blade. This is intended to ensure that at most a defined upper part of the rotor blade breaks off in the event of failure but a crack which forms does not propagate into a rotor blade carrier carrying the rotor blade. Thus, EP 3 480 430 A1 defines different first and second loading zones, which are each designed to be adapted to dynamic loads that arise, but different material or layer thicknesses are intended to ensure that a crack which may form in the rotor blade when the engine is operating does not propagate within a loading zone, considered to be critical, in the region of the transition from the rotor blade to the blade carrier. However, the solutions known from EP 3 480 430 A1 are associated with not inconsiderable additional material costs and increased weight. Moreover, losses in efficiency and hence in the power of the engine, e.g. due to flow losses and/or turbulence, can occur as a result.

Given this background, it is the underlying object of the proposed solution to provide an engine component which is improved in this respect and an improved method of production.

This object is achieved with an engine component and a method of production as disclosed herein.

In a proposed engine component, at least one spatially delimited modification zone with introduced internal tensile stress is formed, via which zone a crack propagating in the engine component is guided to a and/or within a second loading zone in order to avoid crack propagation in a first loading zone.

Thus, on the one hand, the proposed solution proceeds from the basic concept that at least one first loading zone and at least one second loading zone spaced at a distance therefrom are provided on the engine component. In this arrangement, the first and second loading zones can each be designed for (in a manner adapted to) dynamic loads arising at the engine component when the engine component is correctly built into an engine and when the engine is operating. On the other hand, a modification zone with internal tensile stresses introduced in a defined way (referred to as positive internal stresses) is formed, via which zone crack propagation is guided selectively in one of these loading zones or to one of these loading zones, in this case the second loading zone. The intention is as far as possible, by means of the at least one modification zone with introduced internal tensile stresses, to prevent any crack which does form in the engine component from propagating into one (first) loading zone, which is classified as critical for example. Since it has been recognized that one of the decisive factors in the propagation of a crack and, in particular, the direction of propagation of crack growth is what stresses are present at a tip of the crack, it is possible, by means of internal tensile stresses that have already been selectively introduced, to achieve superposition of the stresses that are present at the tip of the crack owing to the crack which has formed with the internal tensile stresses and thus to predefine a preferential direction for further crack propagation in the engine component. Here, the selectively introduced internal tensile stresses border internal compressive stresses, for example, and adjoin the latter and have been introduced by material working and/or a heat input into the engine component.

By means of the modification zone with the introduced internal tensile stresses, crack propagation can be guided outside the first loading zone. In particular, this includes (a), in the case where a crack has formed in the first loading zone, guiding the crack out of the first loading zone and toward the second loading zone by means of the modification zone or (b), in the case of a crack which has formed in the second loading zone, the modification zone is designed to keep this crack outside the first loading zone by means of the at least one modification zone and to guide it in the second loading zone along the modification zone in such a way that the crack cannot propagate into the first loading zone or can propagate into said zone at most with a delay. By means of the modification zone with the introduced internal tensile stresses, crack propagation in a dynamically loaded engine component is thus guided along defined and selectively introduced internal tensile stresses without having to vary material and/or layer thicknesses in different loading zones for this purpose. In this case, on the contrary, crack growth is controlled by means of the selectively introduced internal stresses of the modification zone in order to keep any crack which forms in the engine component outside the first loading zone, even if the engine component is subject to complex dynamic loads during operation.

In one embodiment variant, for the dynamic loads arising at the engine component when the engine component is correctly built into an engine and when the engine is operating, the engine component is designed with a surface contour adapted to the arising dynamic loads, at least in the first loading zone. This includes, for example, that a surface in the first loading zone is of undulating, in particular of concavely and/or convexly arched, design, at least in some portion or portions, in order to counteract vibration-induced load peaks occurring during operation in the engine component in the first loading zone. Thus, for example, in connection with a rotor as an engine component, in particular a "blisk" ("blade integrated disk"), i.e. an integral bladed disk rotor, or a bling ("bladed ring"), i.e. an integral blade ring, selective hub contouring in a transitional region from a rotor blade formed integrally on a blade carrier is possible. It is quite possible for a corresponding adapted surface contour in this transitional region to be combined with the proposed solution, in which internal tensile stresses for a modification zone can be selectively introduced outside or even inside this adapted surface contour in order to guide any crack which forms away from the first loading zone or to ensure that a crack which has formed outside the first loading end zone also continues to be kept outside the first loading zone. It is thus possible, in particular, to combine the proposed solution with what is referred to as "hub contouring".

In principle, internal tensile stress in the at least one modification zone can be introduced into the engine component by mechanical working of a material forming the engine component and/or a heat input. In this context, mechanical working is understood, in particular, to mean mechanical surface treatment, e.g. deep cold rolling, or peening, in this case especially shot peening and laser shock peening.

The at least one modification zone with selectively introduced internal tensile stresses can be provided in the second loading zone, in particular completely in the second loading zone. If the modification zone is provided completely in the second loading zone, any crack which forms can be kept outside the first loading zone, in particular selectively, by means of this zone, and can thus be guided within the second loading zone. Accordingly, it is also possible, in a development based on this, for the at least one modification zone to extend on the engine component at a distance from the first loading zone.

It is possible, in principle, for portions of the modification zone with introduced internal tensile stresses to follow a predetermined path at a surface of the engine component. This includes a situation where portions of the modification zone with introduced internal tensile stresses follow each other along a line, for example. For example, adjoining portions with internal tensile stresses are provided on the engine component so as to follow a predetermined line, in particular to follow a line which extends completely in the second loading zone.

In one embodiment variant, the engine component comprises a blade carrier with rotor blades arranged thereon. In particular, the engine component can comprise a blade carrier manufactured in the form of a blisk or bling with rotor blades formed integrally thereon. Thus, the blade carrier is, for example, disk-shaped or ring-shaped and has rotor blades formed integrally on the blade carrier which follow each other along a circumferential direction around an axis of rotation of the blade carrier.

In the case of an engine component comprising a blade carrier, the first loading zone and the second loading zone can be provided on at least one of the rotor blades. In this case, for example, the first loading zone is situated radially further in than the second loading zone in relation to an axis of rotation of the blade carrier. The first loading zone is thus provided closer to the blade carrier or, in relation to a blade carrier platform (possibly running around the circumference) from which the multiple rotor blades extend radially outward, is provided closer to the platform. The second loading zone is thus, in turn, closer to a blade tip of the respective rotor blade than the first loading zone. In particular, the second loading zone can, for example, comprise a large part of an airfoil of the rotor blade and/or, in particular, the blade tip of the rotor blade.

One proposed embodiment variant aims especially, for example, to avoid crack propagation into a first rotor blade loading zone close to the disk and thus crack propagation into the blade carrier. Especially in the case of a blisk or a bling, this can be of particular advantage for avoiding critical failure of the (entire) engine component. For example, the at least one modification zone is provided on a rotor blade at a predetermined distance from a blade carrier platform from which the rotor blades extend radially outward in relation to an axis of rotation of the blade carrier. In this case, the at least one modification zone can run along the rotor blade at the predetermined distance from the blade carrier platform. Although this is not absolutely necessary, a linear path of the modification zone and, in particular, a rectilinear path of the modification zone can be provided, for example.

In one embodiment variant, the modification zone is provided at a distance from the platform which is in the range of 2.5 mm to 9 mm. In particular, the distance can be in a range of 3.0 mm to 7.5 mm. Here, the respective distance can vary, in particular depending on the material and the dimensions of the rotor blade.

With a view to meaningful separation of the first loading zone (classified as critical in respect of failure) and the second loading zone (classified as less critical) on a rotor blade, provision can be made for the at least one modification zone to be provided in a specific region of an airfoil. For example, the at least one modification zone is provided in a lower third of the rotor blade, that close to the platform, that is to say, in particular, in the region of a lower end of an airfoil of the rotor blade. This includes a variant, for example, in which the rotor blade extends with a blade length from the blade carrier platform as far as a blade tip of the rotor blade, and the at least one modification zone is provided in a lower region of the rotor blade, that close to the platform, which extends over a maximum of 20%, a maximum of 15% or a maximum of 10% of the blade length. Here, as already explained, the lower region can include a lower end of an airfoil of the rotor blade by means of which the rotor blade is in contact with the blade carrier platform, in particular by means of which the rotor blade merges into the blade carrier when the rotor blade is formed integrally with the blade carrier.

The proposed solution also includes an engine having at least one embodiment variant of a proposed engine component. In particular, this can be an engine for an aircraft. In such an engine, an engine component configured as proposed and dynamically loaded during operation can, for example, be part of a rotor in a compressor or in a turbine of the engine.

Another aspect of the proposed solution relates to a method of production for producing an engine component.

In the context of the proposed method, it is envisaged that at least one first loading zone for dynamic loads arising at the engine component when the engine component is correctly built into an engine and when the engine is operating is formed on the engine component, for example with an adapted surface contour in the first loading zone, and a second loading zone is provided spaced at a distance from the first loading zone on the engine component and is designed for dynamic loads arising at the engine component when the engine component is correctly built into an engine and when the engine is operating. Furthermore, at least one spatially delimited modification zone with introduced internal tensile stress is formed on the engine component, via which zone a crack propagating in the engine component is guided to the and/or within the second loading zone—in order to avoid crack propagation in the first loading zone.

In this case, internal tensile stresses to form the modification zone can be introduced into the engine component by heat treatment and/or surface treatment, for example. In particular, for example, surface treatment includes mechanical surface treatment, e.g. peening, in this case, in particular, shot peening or laser shock peening. As an alternative or in addition, internal tensile stresses can be introduced selectively by (local) deep cold rolling of the engine component.

For example, the internal tensile stresses in a surface of the engine component are introduced along a line in order to guide crack propagation along this line.

For example, the engine component to be produced comprises a rotor and the modification zone with the internal tensile stresses is provided in the region of at least one rotor blade of the rotor, in this case, in particular, in a lower third of the rotor blade.

A proposed method of production is suitable, in particular, for producing a proposed engine component. Accordingly, advantages and features of embodiment variants of a proposed engine component which are explained above and below also apply to embodiment variants of a proposed method of production and vice versa.

The appended figures illustrate, by way of example, possible embodiment variants of the proposed solution.

Figure 5:
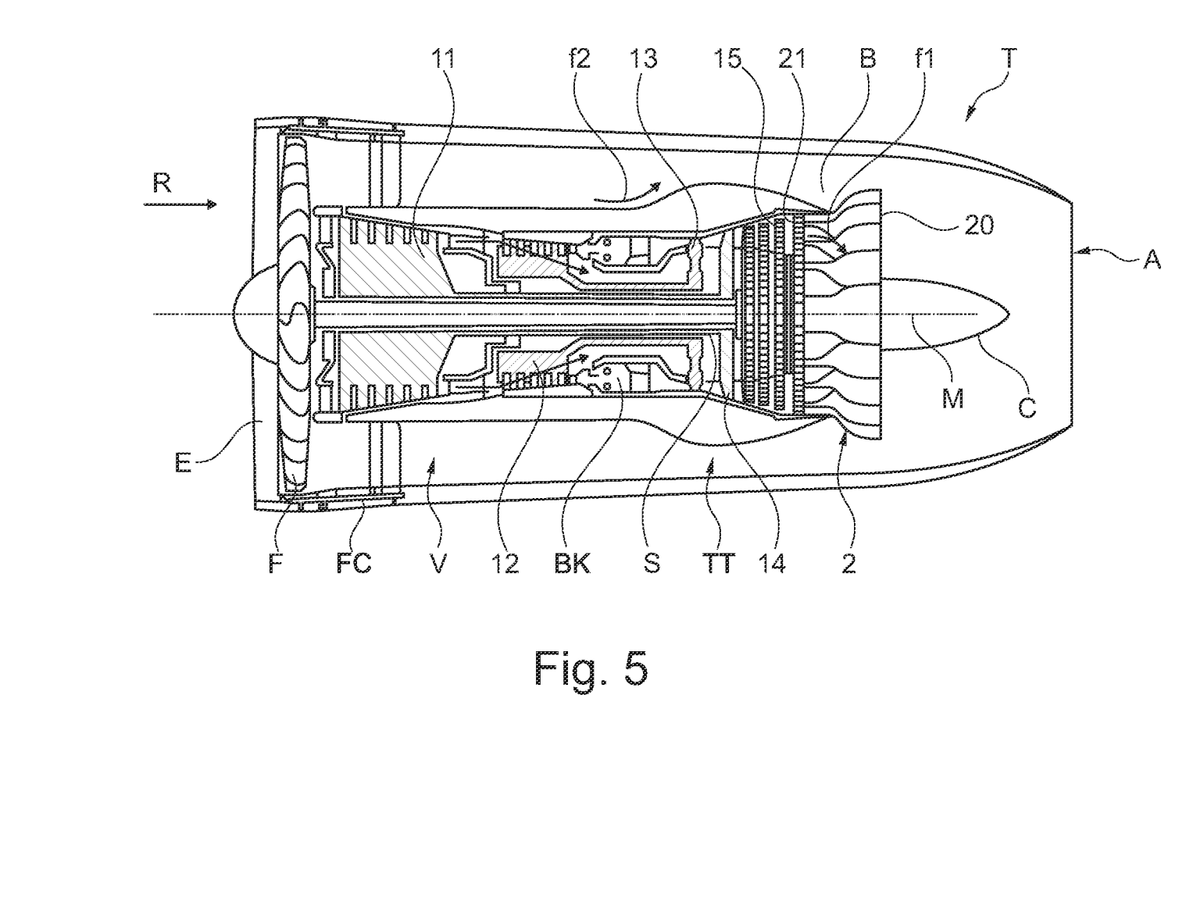
FIG. 5 shows a schematic sectional view of a (gas turbine) engine in which embodiment variants of the proposed solution can be used.

FIG. 5 shows schematically and in a sectional representation an engine T in the form of a turbofan engine, in which the individual engine components are arranged one behind the other along an axis of rotation or central axis M. At an inlet or intake E of the power plant T, air is drawn in along an inlet direction R by means of a fan F. This fan F, which is arranged in a fan casing FC, is driven by means of a core or rotor shaft S which is set in rotation by a turbine TT of the engine T. The turbine TT here adjoins a compressor V, which has, for example, a low-pressure compressor 11 and a high-pressure compressor 12, and optionally also a medium-pressure compressor. The fan F supplies air to the compressor V on the one hand and to a secondary flow duct or bypass duct B on the other, in order to generate thrust. The bypass duct B runs here around a core engine, which comprises the compressor V and the turbine TT and comprises a primary flow duct for the air supplied to the core engine by the fan F.

The air fed into the primary flow duct via the compressor V enters a combustion chamber section BK of the core engine, in which the driving energy for driving the turbine TT is generated. For this purpose, the turbine TT has a high-pressure turbine 13, a medium-pressure turbine 14 and a low-pressure turbine 15. Here, the energy released during combustion is used by the low-pressure turbine TT to drive the rotor shaft S, which carries a rotor, and hence the fan F in order to generate the required thrust by means of the air fed into the bypass duct B. Both the air from the bypass duct B and the exhaust gases from the primary flow duct of the core engine flow out via an outlet A at the end of the engine T. In this arrangement, the outlet A generally has a thrust nozzle with a centrally arranged outlet cone C.

In principle, the fan F may also be coupled via a connecting shaft and an epicyclic planetary gear mechanism to the low-pressure turbine 15, and be driven by the latter. It is furthermore also possible to provide other, differently designed gas turbine engines in which the proposed solution can be used. For example, such engines may have an alternative number of compressors and/or turbines and/or an alternative number of connecting shafts. As an example, the engine may have a split-flow nozzle, meaning that the flow through the bypass duct B has its own nozzle, which is separate from the core engine nozzle and is situated radially on the outside. However, this is not limiting, and any aspect of the present disclosure may also apply to engines in which the flow through the bypass duct B and the flow through the core are mixed or combined before (or upstream of) a single nozzle, which may be referred to as a mixed-flow nozzle. One or both nozzles (whether mixed or split flow) can have a fixed or variable area. While the example described relates to a turbofan engine, the proposed solution may be applied for example to any type of gas turbine engine, such as an open-rotor engine (in which the fan stage is not surrounded by an engine nacelle) or a turboprop engine.

For noise reduction in particular, a mixer 20 is provided as part of a mixer assembly 2 in the region of the outlet A. Via this mixer assembly 2 and the mixer 20, a first fluid stream f1 from the primary flow duct leaving the core engine behind the low-pressure turbine 15, and a second fluid stream f2 from the bypass duct B, are mixed. For this, via a flower-shaped or meandering contour of the mixer 20, alternately parts of the first (primary) fluid stream f1 from the core engine are deflected outward and parts of the second (secondary) fluid stream f2 from the bypass duct B are deflected inward. In this way, in segments hot and cold flow zones are created and a mixing of the two fluid streams f1 and f2 is achieved. The turbulence occurring on mixing reduces low-frequency noise and amplifies high-frequency noise, in order to lower the perceptible noise level overall.

Different engine components are used in the region of the fan F, of the compressor V and of the turbine TT of the engine T, said components being subjected to complex dynamic loads when the engine T is operating. This applies especially to rotors, which are exposed to quasi-static LCF loads (resulting from the peripheral speed of the engine component, with high amplitudes and a long dwell time) and HCF loads (resulting from excitation of a respective engine component by a fluid flow, with low amplitudes but high numbers of cycles and thus high frequency and highly cyclical). This results in a complex superposed stress field. The superposed stresses can lead to a putative crack beginning to grow under LCF loading until what is referred to as an HCF threshold is reached, above which the crack continues to grow under HCF loads. Since HCF loads are high frequency, there is an almost immediate overload fracture in the respective engine component once the HCF threshold is reached.

It is therefore imperative to exclude such overload fractures and any failure of a critical engine component that may be associated with this. At the same time, however, owing to the superposition of the LCF and HCF loads in the case of dynamically loaded engine components, there is the difficulty that it is hard to predict where a crack will form in the engine component, and it is thus also not possible to state how the vibration behavior of the engine component will change. In this context, EP 3 480 430 A1, for example, has proposed influencing crack propagation in a rotor blade by means of different material and layer thicknesses. However, it is not easy to implement an associated local concentration of material, especially retrospectively in the context of maintenance work. Moreover, any local accumulation of material is not easy to implement without negatively affecting the vibration behavior of the respective engine component and/or causing unwanted flow losses and/or turbulence, which lead to losses in the efficiency and therefore the power of the engine.

With the proposed solution, in contrast, at least one spatially delimited modification zone with selectively introduced internal tensile stresses (referred to as positive internal stress) is formed on an engine component, thus enabling a crack which forms to propagate selectively along the introduced internal tensile stresses, the crack propagation being guided in such a way by means of the path of the internal tensile stresses that a crack does not grow in a specific loading zone or at least does not readily grow into a specific loading zone.

Figure 6:
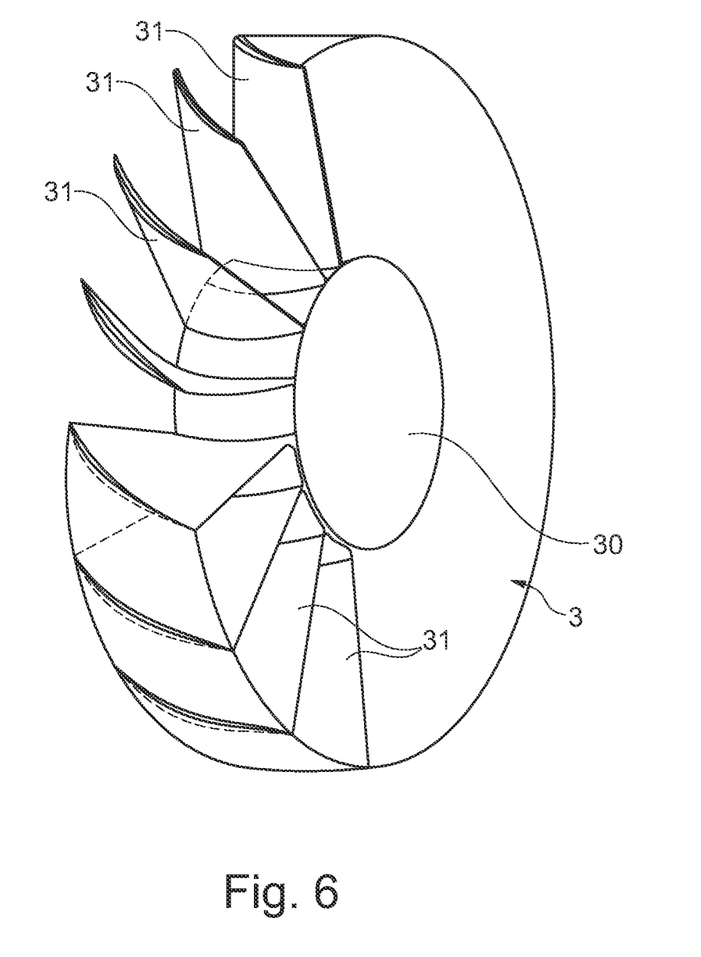
FIG. 6 shows a blisk in a perspective schematic view as an exemplary embodiment of a proposed engine component.

In this context, FIG. 6 illustrates by way of example a blisk 3 as an engine component on which the proposed solution is used. Here, the blisk 3 comprises a blade carrier 30 with rotor blades 31 formed integrally thereon. The blisk 3 thus defines an integral bladed disk rotor, which is arranged in the fan F, the compressor V or the turbine TT of the engine, for example.

Figure 1:
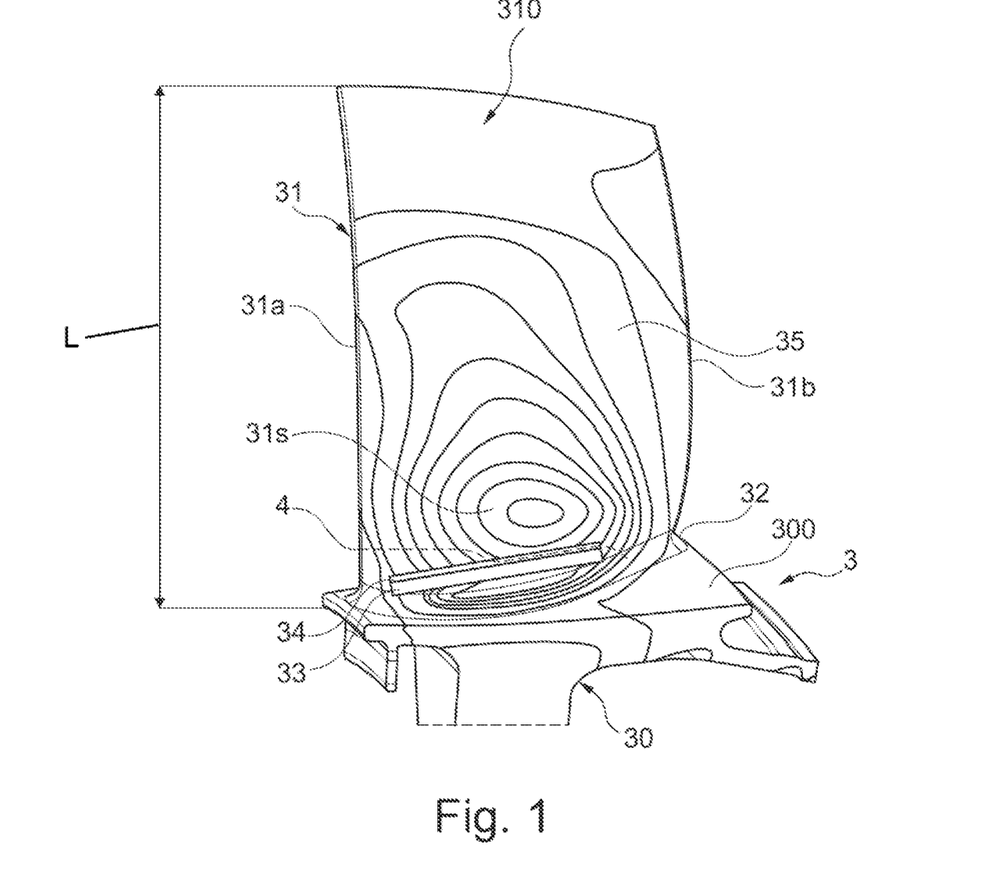
FIG. 1 shows a segment of a blisk in a perspective view with a view of an individual rotor blade (of a plurality of rotor blades of identical design), showing an illustrative stress distribution for the dynamic loads arising during operation as well as a crack, which starts at a leading edge of the rotor blade and, being guided via a modification zone, has propagated in the direction of a trailing edge of the rotor blade.

FIG. 1 shows a segment of one embodiment variant of the proposed solution with the blisk 3. In this case, rotor blades 31 are formed integrally on the disk-shaped blade carrier 30 of the blisk 3 along a circumferential direction around an axis of rotation of the blisk 3, said blades each extending radially outward in relation to the axis of rotation. Here, FIG. 1 shows one of these rotor blades 31 by way of example.

The rotor blade 31 illustrated has a blade length L, which is measured from a platform 300 of the blade carrier 30 on which the rotor blade 31 is formed to a blade tip. The rotor blade 31 extends along this blade length with an airfoil 310, which forms a leading edge 31a (situated upstream when the engine is operating) with a (downstream) trailing edge 31b of the rotor blades 31. When the engine T is operating, the airfoil 310 is subject to a stress distribution 31s due to dynamically arising loads. Particularly because of these dynamic loads, any crack 4 which may form is influenced in its growth on the rotor blade 31 and, in particular, on the airfoil 310, as already explained above. By way of example, FIG. 1 shows a crack 4, which starts in the lower third of the leading edge 31a and has propagated in the direction of the trailing edge 31b.

Two loading zones 33 and 35 are distinguished from one another on the rotor blade 31. A first loading zone 33 lies in a lower third of the rotor blade 31 and, in particular, comprises a transitional region 32 with what is known as a "fillet", at which the rotor blade 31 merges into the platform 300 and hence into the blade carrier 30 with which the rotor blade 31 is integrally formed. If the crack 4 were to propagate into this first loading zone 33 and, beyond the latter, even as far as the blade carrier 30, highly critical failure of the blisk 3 may occur during the operation of the engine T. In respect of crack propagation, the first loading zone 33, which, on the one hand, comprises the transitional region 32 and typically extends over a region of the airfoil 310 which spans less than 20%, in particular less than 15% and, in particular, less than 10% of the total blade length L, is thus classified as critical.

The second loading zone 35, which is classified as uncritical, is spaced apart radially from the first loading zone 33. This second loading zone 35 spans the rest of the airfoil 310 and, in particular, generally includes the blade tip. Crack propagation in this second loading zone 35 can be tolerated since, even in the case of an overload fracture, it is not complete failure of the entire blisk 3 which is the risk but only breaking off of the airfoil 31. If it is now possible selectively to ensure that, when a crack 4 forms, the worst that can happen is that the airfoil 31 breaks off, and this only with a limited length, this not only has a positive effect on operational reliability. Even more, it is possible to make a casing that accommodates the blisk 3 lighter since, in respect of its absorption capacity, this casing can be designed primarily for (relatively small) pieces breaking off from the airfoil 310.

In the case of the embodiment variant in FIG. 1, a modification zone 34, by means of which a propagating crack 4 can be selectively kept outside the first loading zone 33 and crack propagation is guided for as long as possible in the second loading zone 35, is formed in a portion of the second loading zone 35 which adjoins the first loading zone 33. In this way, it is possible—by virtue of the dominance of the radial stresses—to ensure that, from a certain crack length and the associated reduction in cross section at the airfoil 31, the applied tensile stresses keep the crack 4 very largely horizontal and, at worst, the airfoil 31 is sheared off. Here, by way of example, the modification zone 34 extends in a linear manner between the leading edge 31a and the trailing edge 31b, in this case over a large part of the width of the airfoil 310. As a result, the crack 4 illustrated by way of example in FIG. 1 has propagated into the first loading zone 33 only in a final end piece, with a radially inward deflection, but has not propagated as far as the blade carrier 30.

In the present case, internal tensile stresses, along which the crack 4 propagates, have been introduced selectively into the airfoil 310 in the modification zone 34. Thus, the applied dynamic loads are superimposed on a corresponding internal tensile stress. Since the positive stresses are decisive for the direction of propagation of the crack at the crack tip, the direction of propagation of a crack 4 which forms can be influenced in this way and kept selectively radially on the outside and thus at a distance from the first loading zone 33, which is classified as critical.

Figure 2:
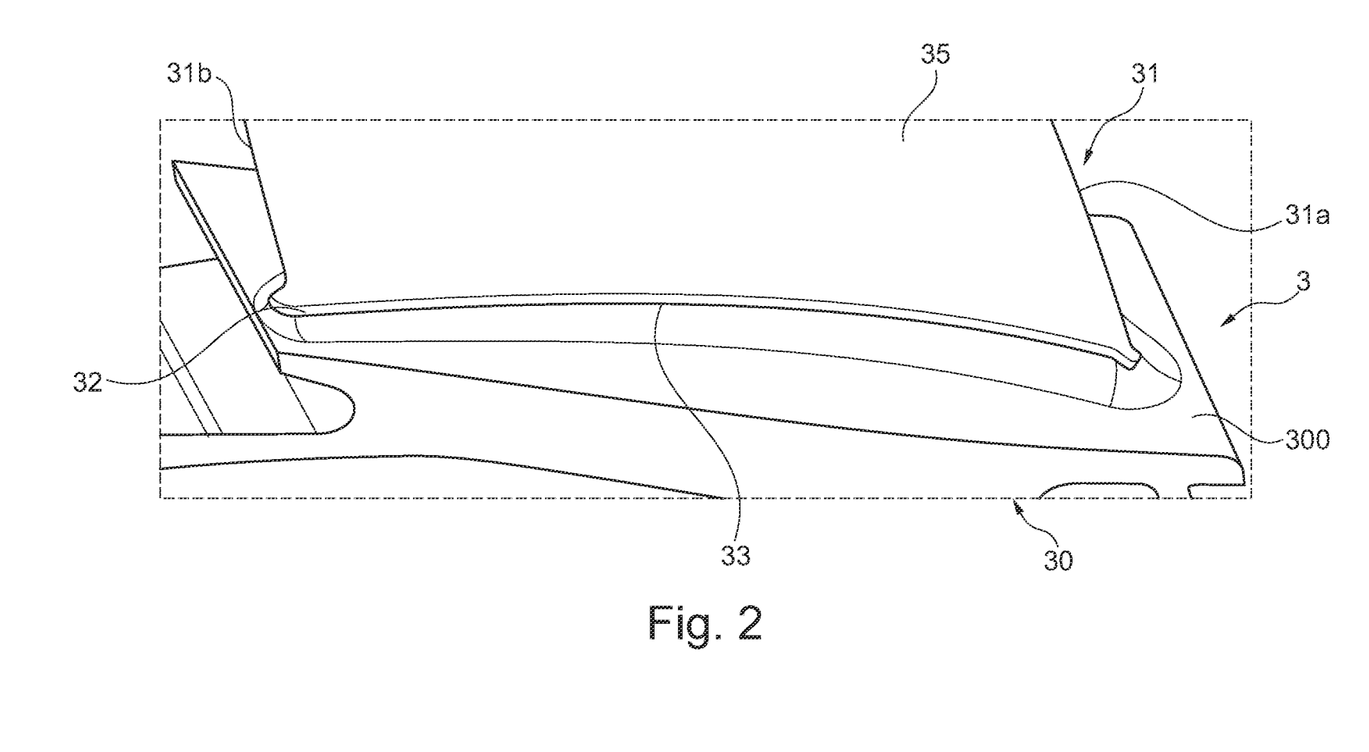
FIG. 2 shows a segment of the blisk on an enlarged scale with the individual rotor blade of FIG. 1, illustrating different loading zones in the lower third of an airfoil of the rotor blade.

As can be seen in the enlarged illustration in FIG. 2, a separating line between the two loading zones 33 and 35 does not run rectilinearly from the leading edge 31a to the trailing edge 31b. On the contrary, there is a curved or even undulating separating line in the present case. Furthermore, the first loading zone 33, which is close to the platform, can also be provided with an optimized surface contour and thus with additional elevations and depressions in order to avoid stress peaks in the transitional region 32 in the case of superposed LCF and HCF loads.

Figure 3:
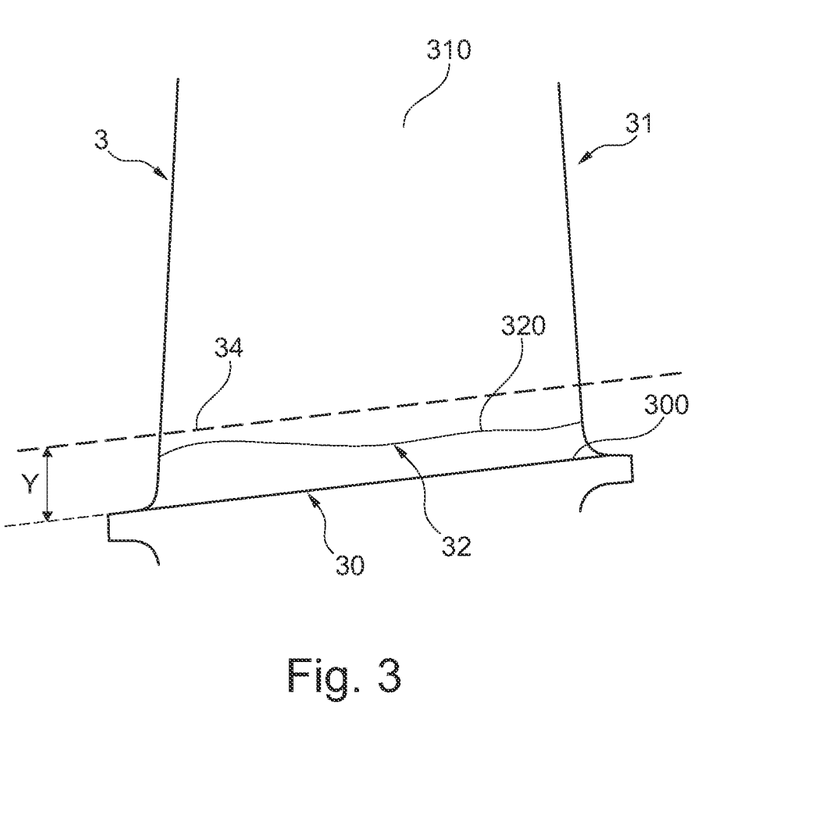
FIG. 3 shows a schematic side view of the rotor blade of FIGS. 1 and 2, illustrating the path of the modification zone and of an undulating contour line, running radially further in than the latter, for a boundary between two loading zones of the rotor blade.

In the embodiment variant illustrated, provision is therefore made, as illustrated in greater detail by means of the side view in FIG. 3, that the modification zone 34 extends at a defined distance Y from the platform 300 of the blade carrier 30, in a lower third of the airfoil 310. Thus, the modification zone 34 with the selectively introduced internal tensile stresses is radially further out than a contour or separating line 320 which defines a (virtual) boundary between the first and second loading zones 33 and 35. For example, the distance Y, which determines the position of the motivation zone 34, is in the range of 3.0 mm to 7.5 mm. The "fillet" of the blisk 3, toward which the propagation of a crack 4 is to be avoided, is then situated radially on the inside with respect to the contour line 320.

Figure 4:
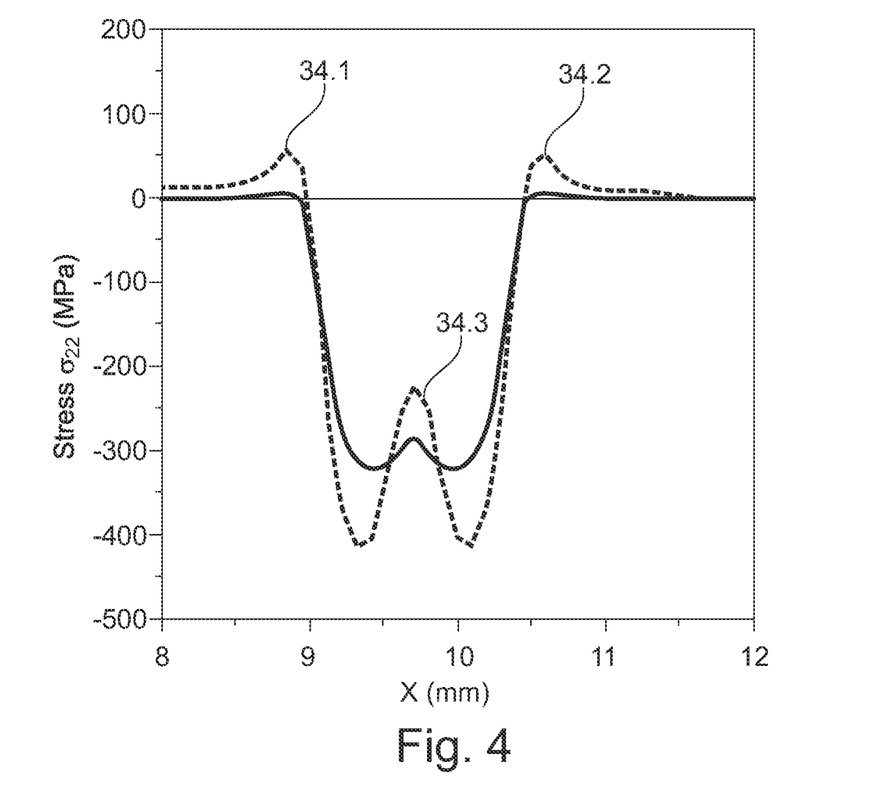
FIG. 4 shows illustrative profiles of introduced internal stresses in a modification zone according to FIG. 1 and FIG. 3, transversely to the surface.

The formation of a motivation zone 34 is illustrated in more detail once again on the basis of possible internal stress profiles corresponding to the diagram in FIG. 4. In the diagram in FIG. 4, a stress is plotted against a parameter X, which is a measure of the extent transversely to the surface of the airfoil 310. It can be seen from the illustrated curves in FIG. 4 that there is a central internal compressive stress 34.3, which is bordered on both sides by (positive) internal tensile stresses 34.1, 34.2. Consequently, a stress field with positive internal tensile stresses 34.1 and 34.2 is introduced into the surface of the rotor blade 31 in the modification zone 34, with the result that a crack which forms will preferably propagate along the path of an internal tensile stress 34.1, 34.2.

For the introduction of the internal tensile stresses 34.1 and 34.2 (possibly accompanied by the internal compressive stresses 34.3 extending into the depth of the surface), a mechanical surface treatment can be provided, for example. For example, a corresponding profile can be achieved by shot peening or laser shock peening or by deep cold rolling. As an alternative or in addition, a localized heat treatment can be provided to generate local internal tensile stresses (optionally without or with significantly reduced internal compressive stresses compared with the variant in FIG. 4).

LIST OF REFERENCE SIGNS

11 Low-pressure compressor
12 High-pressure compressor
13 High-pressure turbine
14 Medium-pressure turbine
15 Low-pressure turbine
2 Mixer assembly
20 Mixer
21 Interface
3 Blisk (engine component)
30 Blade carrier
300 Platform
31 Rotor blade
310 Airfoil
31a Leading edge
31b Trailing edge
31s Stress distribution
32 Transitional region
320 Contour line
33 1st loading zone
34 Modification zone
34.1, 34.2 Internal tensile stress
34.3 Internal compressive stress
35 2nd loading zone
4 Crack
A Outlet
B Bypass duct
BK Combustion chamber section
C Outlet cone
E Inlet/Intake
F Fan
f1, f2 Fluid stream
FC Fan casing
L Blade length
M Central axis/Axis of rotation
R Inlet direction
S Rotor shaft
T Engine
TT Turbine
U Circumferential direction
V Compressor
Y Distance/Height

The invention claimed is:

1. An engine component comprising:
at least one first loading zone, configured for dynamic loads arising at the engine component when the engine component is built into an engine and when the engine is operating,
a second loading zone, spaced at a distance from the first loading zone on the engine component and configured for dynamic loads arising at the engine component when the engine component is built into the engine and when the engine is operating,
at least one spatially delimited modification zone with introduced internal tensile stress formed on the engine component, wherein via the at least one spatially delimited modification zone, a crack propagating in the engine component is at least one chosen from guided to the second loading zone and guided within the second loading zone to avoid crack propagation in the first loading zone; and
wherein the at least one spatially delimited modification zone is provided in the second loading zone.

2. The engine component as claimed in claim 1, wherein, for the dynamic loads arising at the engine component when the engine component is built into an engine and when the engine is operating, the engine component includes a surface contour adapted to the arising dynamic loads, at least in the first loading zone.

3. The engine component as claimed in claim 1, wherein the internal tensile stress of the at least one spatially delimited modification zone is introduced into the engine component by mechanical working of a material forming the engine component and/or by a heat input.

4. The engine component as claimed in claim 1, wherein the at least one spatially delimited modification zone runs at a distance from the first loading zone.

5. The engine component as claimed in claim 1, wherein portions of the at least one spatially delimited modification zone with introduced internal tensile stresses follow a predetermined path at a surface of the engine component.

6. The engine component as claimed in claim 5, wherein portions of the at least one spatially delimited modification zone with introduced internal tensile stresses follow each other along a line.

7. The engine component as claimed in claim 1, wherein the engine component comprises a blade carrier with rotor blades arranged thereon.

8. The engine component as claimed in claim 7, wherein the first loading zone and the second loading zone are provided on at least one of the rotor blades.

9. The engine component as claimed in claim 8, wherein the first loading zone is situated radially further in than the second loading zone in relation to an axis of rotation of the blade carrier.

10. The engine component as claimed in claim 7, wherein the at least one spatially delimited modification zone is provided on a rotor blade at a predetermined distance from a platform of the blade carrier from which the rotor blades extend radially outward in relation to an axis of rotation of the blade carrier.

11. The engine component as claimed in claim 10, wherein the at least one spatially delimited modification zone is provided at a distance from the platform which is in a range of 2.5 mm to 9 mm.

12. The engine component as claimed in claim 7, wherein at least one of the rotor blades extends from a platform of the blade carrier, radially outward in relation to an axis of rotation of the blade carrier, as far as a blade tip, and the at least one spatially delimited modification zone is provided in an inner third of the at least one of the rotor blades.

13. The engine component as claimed in claim 12, wherein the at least one spatially delimited modification zone is provided within an inner maximum of 20% of the blade length.

14. The engine component as claimed in claim 12, wherein the at least one spatially delimited modification zone is provided within an inner maximum of 15% of the blade length.

15. The engine component as claimed in claim 12, wherein the at least one spatially delimited modification zone is provided within an inner maximum of 10% of the blade length.

16. An engine having at least one of the engine component as claimed in claim 1.

17. The engine component as claimed in claim 1, wherein the engine component comprises a blade carrier with rotor blades arranged thereon, the blade carrier manufactured as a blisk or bling with rotor blades formed integrally thereon.

18. A method for producing an engine component, wherein
  at least one first loading zone is formed on the engine component for dynamic loads arising at the engine component when the engine component is built into an engine and when the engine is operating, and
  a second loading zone is provided spaced at a distance from the first loading zone on the engine component and configured for dynamic loads arising at the engine component when the engine component is built into an engine and when the engine is operating,
  wherein at least one spatially delimited modification zone with introduced internal tensile stress is formed on the engine component, wherein via the at least one spatially delimited modification zone, a crack propagating in the engine component is at least one chosen from guided to the second loading zone and guided within the second loading zone in order to avoid crack propagation in the first loading zone; and
  wherein the at least one spatially delimited modification zone is provided in the second loading zone.

19. The method as claimed in claim 18, wherein internal tensile stresses for the formation of the at least one spatially delimited modification zone are introduced into the engine component by a heat treatment and/or a surface treatment.

20. The method as claimed in claim 18, wherein internal tensile stresses for the formation of the at least one spatially delimited modification zone are introduced into the engine component by peening or deep cold rolling.

* * * * *